Sept. 8, 1931. H. J. HATER Re. 18,178

PISTON

Original Filed Sept. 15, 1922

Inventor:
Harry J. Hater,
by
William L. Symons
his Att'y.

Reissued Sept. 8, 1931 Re. 18,178

UNITED STATES PATENT OFFICE

HARRY J. HATER, OF CINCINNATI, OHIO, ASSIGNOR, BY MESNE ASSIGNMENTS, TO THE CLEVELAND TRUST COMPANY, OF CLEVELAND, OHIO

PISTON

Original No. 1,656,482, dated January 17, 1928, Serial No. 588,473, filed September 15, 1922. Application for reissue filed April 28, 1928. Serial No. 274,321.

My invention relates to pistons of the type generally used in internal combustion engines, the piston comprising generally a solid head portion and a skirt or tubular portion extending from the head portion.

The object of my invention is to construct a piston which will not be expensive to manufacture; which will fit efficiently in the cylinder without scoring or otherwise injuring it; which will fit in the cylinder with less clearance than is necessary in other pistons; which will not "knock", "slap", or "chatter"; which will have a uniform fit in the cylinder throughout its circumference; which will function properly at all speeds of the motor; which will not cave in; which will not spring on the thrust side of the motor when subjected to load, and which will be perfectly lubricated.

With these and further objects in view, one embodiment of my invention is shown in the accompanying drawings in which.

Figure 1:
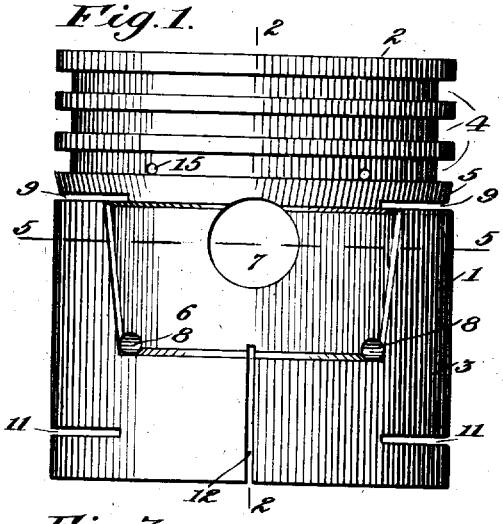
Figure 1 is an elevation of my piston.
Figure 2:
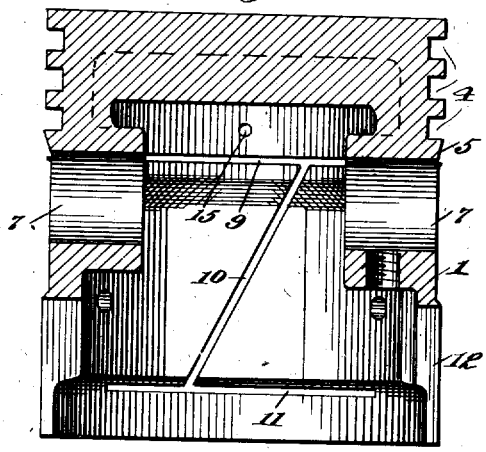
Figure 2 is a section on line 2—2 of Figure 1.
Figure 3:
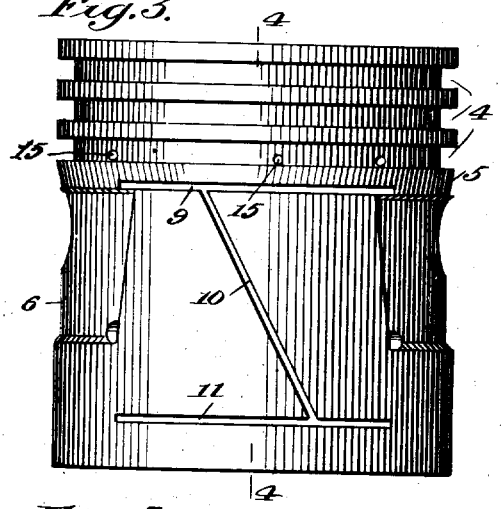
Figure 3 is an elevation with the piston turned 90 degrees from the piston shown in Figure 1.
Figure 4:
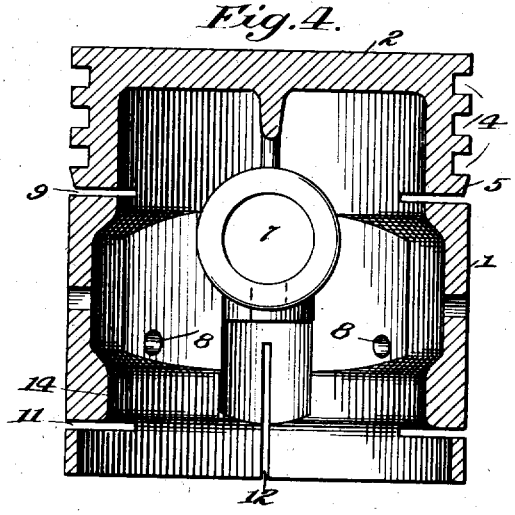
Figure 4 is a section on line 4—4 of Figure 3.
Figure 5:
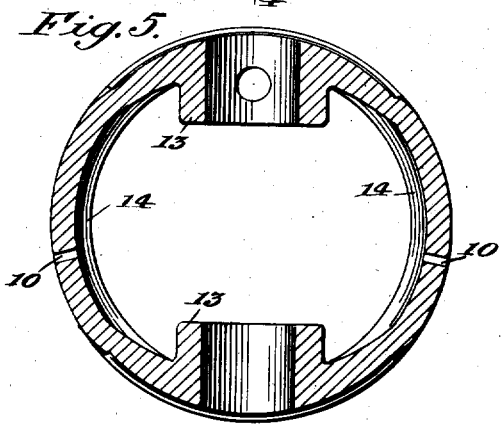
Figure 5 is a section on line 5—5 of Figure 1.

My piston designated as a whole by 1 has a solid head 2 and a depending hollow skirt 3. The head contains the usual piston ring grooves 4, three being shown. The head below the lower groove is slightly beveled, shown accentuated in the drawings at 5, to enable the oil which reaches this part of the head to drain back through the relief oil holes and the transverse slits in the skirt of the piston. The metal of the skirt portion is cut away at 6 in the form of a key stone around the piston pin opening 7. Oil holes 8 are spaced around each piston pin opening within the key stone relief. A transverse slit 9 extends from just inside one key stone relief to just inside the opposite key stone relief. A diagonal slit 10 extends from the transverse slit to a lower transverse slit 11 which is parallel with the upper transverse slit and of practically the same length. The transverse slits and diagonal slit are duplicates on opposite sides of the piston. A vertical slit 12 extends from the bottom of the skirt substantially in line with the center of the piston pin opening to just within the key stone relief. These diagonal slits are in opposite sides of the piston and are duplicates. The piston has the usual piston pin bosses 13. A rib 14 adjacent the lower part of the skirt extends around the inside circumference of the skirt disappearing at the part directly below the piston pin bosses. There may be openings 15 from the inside of the piston to the bottom of the lower ring groove.

The construction described results in the production of a pair of resilient parts on opposite sides of the piston, 90 degrees from the piston pin openings. As these parts do not extend to the bottom of the skirt of the piston, they will not be sprung out of alignment, this being prevented by the uncut skirt portion below the bottom of the resilient parts. The vertical slits take care of the expansion of the piston, preventing scoring of the cylinder.

Having thus described my invention, what I claim and desire to protect by Letters Patent is:—

1. A piston comprising a head and depending skirt, said skirt having piston pin openings therein, said skirt having reliefs around said openings, said skirt having transverse slits therein, one of said transverse slits extending from a point within one relief to a point within the opposite relief, said skirt having a diagonal slit therein connecting said transverse slits and said skirt having a vertical slit therein extending from the bottom of said skirt to a point within said relief.

2. A piston comprising a head and depending skirt, said skirt having piston pin openings therein, said skirt having reliefs around said openings, said skirt having transverse slits therein on opposite sides of said skirt, one of each of said transverse slits extending from a point within one relief to a point within the opposite relief, said skirt having diagonal slits therein on opposite sides of said skirt connecting each pair of transverse slits, and said skirt having vertical slits therein on opposite sides of said skirt extending from the bottom of said skirt to a point within said reliefs.

3. A piston comprising a head and depending skirt, said skirt having piston pin openings therein, said skirt having reliefs around said openings, said skirt having transverse slits therein on opposite sides of said skirt, one of each of said transverse slits extending from a point within one relief to a point within the opposite relief, said skirt having diagonal slits therein on opposite sides of said skirt connecting each pair of transverse slits, and said skirt having vertical slits therein on opposite sides of said skirt extending from the bottom of said skirt to a point within said reliefs, said vertical slits being placed substantially 90 degrees from a vertical line extending from the bottom of said skirt through the middle point of said diagonal slits.

In testimony whereof I affix my signature.

HARRY J. HATER.